Figure 1A:
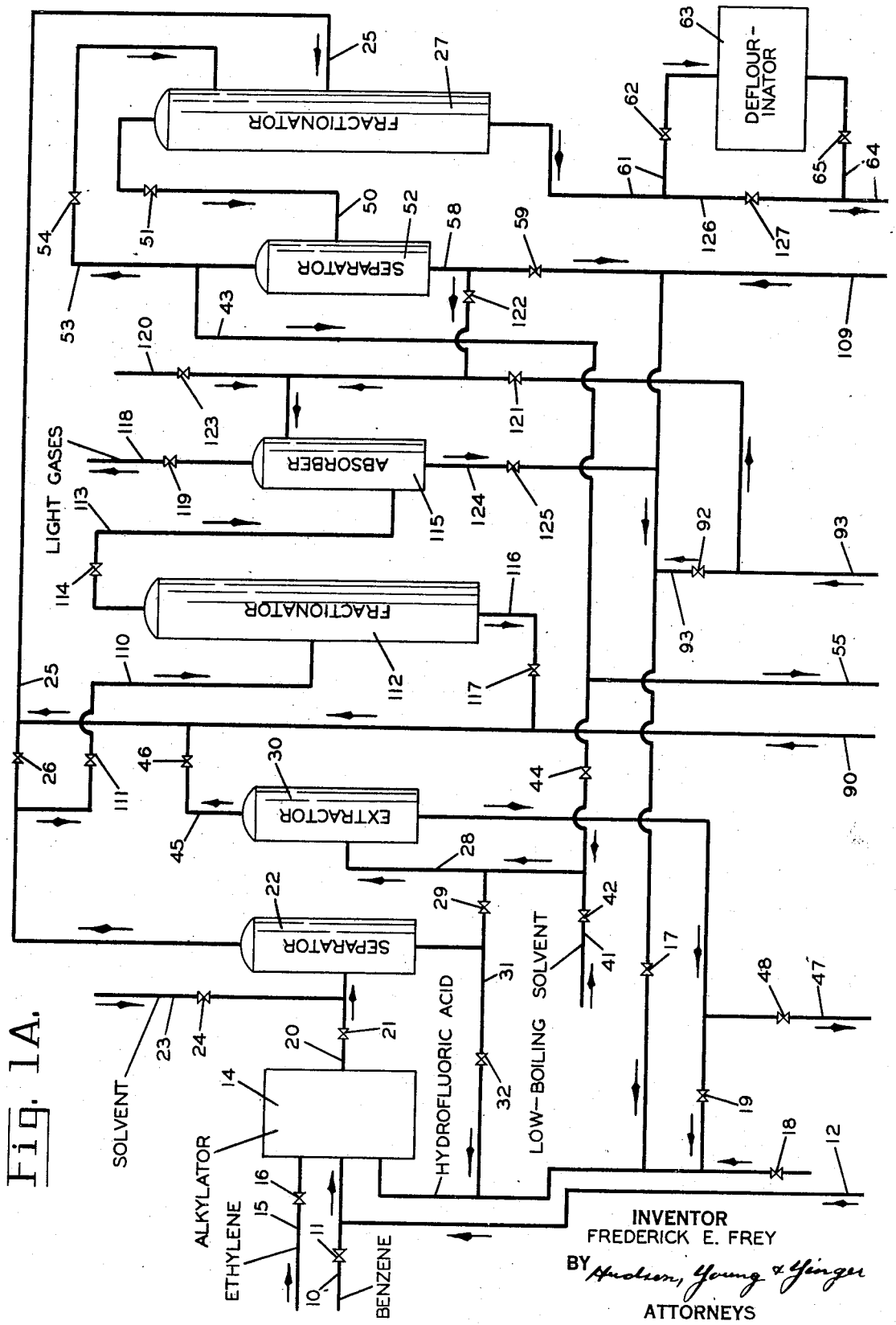

INVENTOR
FREDERICK E. FREY
BY Hudson, Young & Yinger
ATTORNEYS

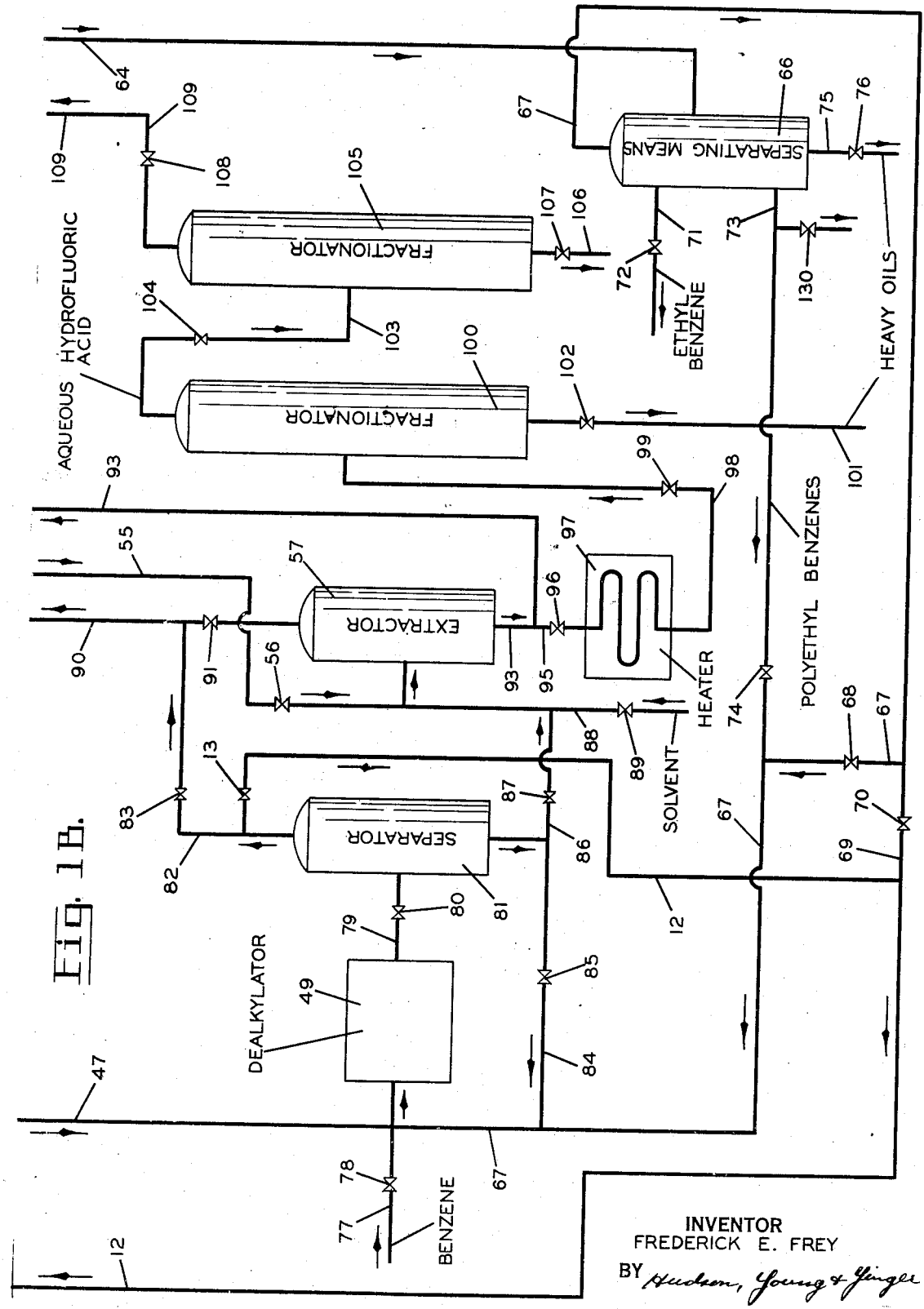

Patented Feb. 12, 1946

2,394,905

UNITED STATES PATENT OFFICE 2,394,905

ALKYLATION OF BENZENE

Frederick E. Frey, Bartlesville, Okla., assignor to Phillips Petroleum Company, a corporation of Delaware Application February 19, 1942, Serial No. 431,571

12 Claims. (Cl. 260—671)

This invention relates to the conversion of hydrocarbons. More particularly it relates to a process for alkylating benzene with normally gaseous olefins, especially ethylene, in the presence of hydrofluoric acid as a catalyst to produce monoalkyl benzenes.

In the past, the direct alkylation of benzene with ethylene has been effected by catalysts such as aluminum chloride, phosphoric acid and mixtures of phosphoric anhydride with lampblack. The products obtained were mixtures of ethylbenzene, diethylbenzene, triethylbenzene, and the like. Hydrofluoric acid has been used experimentally to effect alkylation of benzene with olefins having at least three carbon atoms per molecule. One unsuccessful experimental attempt to prepare ethylbenzene from benzene and ethylene in the presence of hydrofluoric acid as a catalyst has been recently reported by Simons and Passino, J. Am. Chem. Soc. 62, 1624 (1940).

According to a specific modification of this invention benzene and ethylene are reacted in an alkylating zone in the presence of substantially anhydrous liquid hydrofluoric acid as a catalyst to produce predominantly ethylbenzene. Under some conditions substantial proportions of ethyl fluoride and polyethylbenzenes are also produced. Such ethyl fluoride may be advantageously removed from the hydrocarbon effluent from the alkylating zone by absorption in concentrated hydrofluoric acid, and the resulting extract or absorbate may be recycled to the alkylating zone, wherein the ethyl fluoride is consumed as an alkylating agent to produce more ethylbenzene. The by-product polyethylbenzenes also may be advantageously reacted with an excess of benzene in the presence of hydrofluoric acid to produce ethylbenzene. Used acid separated from the effluents from the alkylating zone may be advantageously treated with excess benzene, whereby acid-soluble materials are removed from the acid, and the yield of alkylate is increased. To facilitate the separation of aromatics, such as benzene and ethylbenzene, from hydrofluoric acid, a solvent for aromatics, such as butane, pentane, or the like, having a low specific gravity and a low miscibility with liquid anhydrous hydrofluoric acid, may be advantageously added to the aromatic hydrocarbon-hydrofluoric acid mixture, whereby the difference in specific gravity between the two phases is increased, and the miscibility is decreased; the solvent, preferably normal butane, is subsequently distilled from the aromatic hydrocarbons, automatically removing with it the last traces of dissolved hydrogen fluoride.

An object of this invention is to provide a process for alkylating benzene with olefins to produce monoalkyl benzene in high yield.

A specific object is to recover and utilize normally gaseous alkyl fluorides produced as by-products in such a process.

Another object of my invention is to provide a process for alkylating benzene with ethylene to produce ethylbenzene in high yield.

Another specific object is to provide a step wherein used hydrofluoric acid is agitated with benzene and small proportions of polyethylbenzenes produced by secondary alkylation reactions, whereby the used acid is revivified and the yield of desired product is increased.

Another specific object is to separate efficiently aromatic hydrocarbons from hydrofluoric acid by using a solvent for the hydrocarbons, the solvent having a low specific gravity, being substantially immiscible with anhydrous hydrofluoric acid at low temperatures and being capable of forming a low-boiling azeotropic mixture with hydrofluoric acid.

Still other objects and advantages of this invention will be apparent from the accompanying description and discussion.

An understanding of my invention may be aided by referring to the accompanying drawings, Figures 1A and 1B, which is a schematic flow-diagram of a preferred arrangement of apparatus for practicing my invention, and also for practicing various modifications of my invention.

In this arrangement, benzene is admitted through inlet 10, valve 11, and/or conduit 12 directly from separator 81 through valve 13 and/or from conduit 69 to alkylator 14. Ethylene is admitted through one or more inlets, such as inlet 15 having valve 16; and substantially anhydrous hydrofluoric acid is admitted through valves 17, 18, and/or 19. Alkylator 14 may be any convenient reaction vessel having an agitating means and capable of withstanding alkylating conditions. The reaction temperature may be broadly in the range of about 50 to 500° F., but it is preferably in the range of 200 to 350° F. The pressure may be as high as is desired, but it need be only sufficient to maintain substantially all of the reaction mixture in the liquid state. The average reaction time generally may vary in the range of about 1 to 100 minutes or more, depending on the other reaction conditions. Conditions outside of these ranges are suitable in some cases, but ordinarily optimum yields are obtained at minimum cost under the conditions stated.

One inexpensive but efficient type of reaction chamber, which we have found very advantageous for use in this process, consists of a vertical cylindrical chamber having a jet-type inlet near the bottom for the hydrocarbon feed, an inlet near the bottom for hydrofluoric acid, and an outlet near the top for withdrawing the reaction mixture. When operating at relatively high temperatures the benzene-ethylene feed is appreciably soluble in the hydrofluoric acid, and hence very little stirring apparatus is required to obtain efficient mixing and intimate contacting between the several components of the reaction mixture.

Under some conditions of addition of ethylene to benzene to form ethylbenzene, one or more undesired competing side reactions and/or secondary reactions may tend to reduce the yield of ethylbenzene. Among these reactions are polymerization, disproportionation, cyclization, hydrofluorination, polyethylation, and formation of such materials as toluene and methyl fluoride. Not all of these side and secondary reactions are well understood; however, bimolecular and polymolecular reactions of ethylene and secondary alkylation reactions and/or polyethylation of benzene may be substantially reduced by maintaining a large molal excess of benzene in the reaction mixture. Good results are ordinarily obtained if the molal ratio of benzene to ethylene is in the range of about 10 or more to 1; the results improve with increase in this ratio, and a ratio of 100 or more to 1 is desirable. The formation of toluene and methyl fluoride appears to occur at very high temperatures and long reaction times. The formation of ethyl fluoride in the products occurs chiefly at low temperatures and short reaction times; ethyl fluoride may be advantageously separated from the products and recycled to the alkylating zone, for it acts as an alkylating reactant if the time is sufficiently long. Polyethylbenzenes, among which diethylbenzene appears to predominate, may be recycled to the alkylating zone or may be passed to a separate zone for treating with excess benzene in the presence of a catalyst to increase the yield of monoethylbenzene, to which the term ethylbenzene is ordinarily limited herein.

The proportion of hydrofluoric acid preferably is in the range of about 0.2 to 4 times the weight of hydrocarbon in the reaction mixture. With less acid the rate of reaction is low; but no useful end is achieved by using very large proportions of acid, especially since separation of small proportions of hydrocarbon from large proportions of acid is relatively difficult.

The reaction mixture from alkylator 14 passes through conduit 20 having valve 21 to separator 22, wherein it is separated into two liquid phases, as by cooling and/or gravitational or centrifugal means. Under some conditions of operation, when the mixture is an emulsion that is difficult to separate, a solvent of low density and low miscibility with hydrofluoric acid, such as one or more butanes and/or pentanes may be advantageously added to the mixture through inlet 23 having valve 24 to aid the separation in separator 22, but usually this procedure is not necessary unless the acid-to-hydrocarbon ratio is very high. The separated lighter or hydrocarbon phase is passed through conduit 25 having valve 26 to fractionating column 27. The heavier or hydrofluoric acid phase is passed through conduit 28 having valve 29 to extractor 30; ordinarily at least a part of it is recycled through conduit 31 having valve 32 to alkylator 14.

A solvent for aromatics, which has a low specific gravity and is substantially immiscible with liquid anhydrous hydrofluoric acid, such as one or more butanes or pentanes, may be added through inlet 41 having valve 42 and/or conduit 43 having valve 44 to the feed to extractor 30 to extract hydrocarbons dissolved or suspended in the acid. The desirability for this solvent extraction step arises because benzene and ethylbenzene are appreciably soluble in anhydrous hydrofluoric acid and because the difference in density between them and hydrofluoric acid is relatively low; also, in a subsequent distillation step, the solvent aids in removing dissolved hydrogen fluoride from the desired products. The proportion of solvent is preferably in the range of about 2 to 20 per cent by weight of the acid; for optimum results, it is dependent somewhat upon the temperature used in the separating step, being greater the higher the temperature. A hydrocarbon or extract layer is withdrawn overhead from extractor 30 and is passed through conduit 45 having valve 46 to fractionating column 27. An acid layer, consisting of the bulk of the acid withdrawn in the effluent from alkylator 14, is withdrawn from extractor 30 and is passed through conduit 47 having valve 48 to treater 49. If desired, part of the acid may be recycled to alkylator 14 through valve 19.

From column 27, a low-boiling azeotropic mixture of hydrofluoric acid and the aforementioned solvent is passed through conduit 50 having valve 51 to separator 52, wherein the mixture is separated by cooling and settling into a solvent phase and a hydrofluoric acid phase. The solvent phase may be returned in part through conduit 53 having valve 54 as reflux to column 27; preferably a substantial proportion is recycled through conduit 43 having valve 44 and/or conduit 55 having valve 56 to extractors 30 and/or 57, respectively. The hydrofluoric acid phase from separator 52 may be recycled through conduit 58 and valves 59 and 17 to alkylator 14.

A bottom fraction from column 27, comprising hydrocarbons substantially free of hydrofluoric acid but usually containing some organically combined fluorine, is passed through conduit 61 having valve 62 to defluorinator 63, whereby organic fluorine is substantially completely removed by contacting the hydrocarbon, usually in the liquid condition, with a dehydrogenation or hydrogenation-type catalytic contact mass at a temperature in the range of about 50 to 500° F. Although any of many contact masses having hydrogenation and/or dehydrogenation properties may be used, bauxite is preferred because of its availability and low cost.

A substantially fluorine-free hydrocarbon effluent from defluorinator 63 is passed through conduit 64 having valve 65 to separating means 66, which may consist of any known means such as fractionation or solvent-extracting units for separating the effluent into the desired fractions. A benzene fraction may be passed through conduit 67 having valve 68 to treater or dealkylator 49; in some instances it may be desirable to recycle part of the benzene fraction directly, as from conduit 67 through conduit 69 having valve 70 to conduit 12 and alkylator 14. An ethylbenzene fraction may be withdrawn through outlet 71 having valve 72. Diethylbenzene and other polyethylbenzenes may be passed, as through conduit 73 having valve 74 to treater or dealkylator 49, or may be withdrawn as a product of the process through valve 130, and other products, such as high-boiling oils, may be withdrawn through outlet 75 having valve 76.

In treater or dealkylator 49 either one, and generally both, of two different reactions are carried out. One is a purification of impure hydrofluoric acid and the other is the dealkylation of polyalkylbenzenes to form monoalkyl benzenes. In carrying out both treatments, hydrofluoric acid previously used in the alkylation step and containing dissolved ethyl fluoride and other acid-soluble material is mixed with benzene, which may be introduced through inlet 77 having valve 78 and/or through conduit 67, and with polyethylbenzenes, which may be introduced through conduit 73. The conditions preferably are somewhat more drastic than those in alkylator 14 because the reaction of polyethylbenzene with benzene to form ethylbenzene is slower than the primary ethylation of benzene. Suitable conditions are: a temperature in the range of about 100 to 800° F., preferably 250 to 600° F. pressure sufficient to maintain the liquid or a correspondingly dense state; and a reaction time of from about 5 to 500 minutes, or more. Under these conditions alkyl fluorides and other acid-soluble materials are converted mainly to acid-insoluble materials, such as alkylbenzenes, and polyethylbenzenes are converted substantially to monoethylbenzene. If desired, catalyst promotors, such as inorganic fluorides soluble in hydrofluoric acid and/or contact masses, may be used to aid the reaction and to lessen the severity of the treating conditions.

The reaction mixture from treater or dealkylator 49 is passed through conduit 79 having valve 80 to separator 81, wherein it is separated into two liquid phases, as by cooling and/or gravitational settling or centrifugation. The lighter or hydrocarbon phase preferably is passed through conduit 12 having valve 13 as feed to alkylator 14; in some instances when it contains relatively large proportions of ethylbenzene or other desired products it may be passed entirely or in part through conduit 82 having valve 83 to column 27. Part of the heavier or hydrofluoric acid phase from separator 81 may be recycled through conduit 84 having valve 85 to treater or dealkylator 49; preferably, most of it is passed through conduit 86 having valve 87 to extractor 57.

Extractor 57 is similar in function to extractor 30. A hydrocarbon solvent, of low density and relatively immiscible with anhydrous hydrofluoric acid, is introduced through inlet 88 having valve 89 and/or through conduit 55 having valve 56. The solvent is agitated with, and extracts dissolved and suspended hydrocarbons from, the hydrofluoric acid. The mixture is allowed to separate into two layers. The lighter or solvent layer is passed through conduit 90 having valve 91 to fractionator 27. The heavier or acid phase may be passed through conduit 93, valve 92, and valve 17 to alkylator 14. Preferably at least part of the acid is passed through conduit 95 having valve 96 to heater 97.

In heater 97, the used acid, which contains some acid-soluble or deactivating material not removed in other acid-treating steps, is heated to a temperature, preferably in the range of about 250 to 400° F., high enough to decompose fluoroorganic compounds. From heater 97 the material passes through conduit 98 having valve 99 to fractionating column 100. Fractionator 100 effects a separation into high-boiling oil which is withdrawn through outlet 101 having valve 102, and an acid-water fraction (containing water brought incidentally into the process) which is passed through conduit 103 having valve 104 to fractionating column 105. From fractionator 105, a kettle fraction comprising an aqueous solution of hydrofluoric acid is withdrawn through outlet 106 having valve 107, and an overhead fraction of substantially anhydrous hydrofluoric acid is passed through valve 108, conduit 109 and valve 17 to alkylator 14.

Under some conditions, appreciable proportions of gaseous products such as butane, propane, ethane, ethyl fluoride, and/or other alkyl fluorides may be present, either produced by side reactions or introduced to the process with reactants. It is desirable to recover the alkyl fluorides, especially ethyl fluoride, and to recycle them to the alkylating zone as alkylating reactants, thereby increasing the overall yield of alkylated benzene. The recovery may be accomplished as follows: Valve 26 in conduit 25 is closed, and the hydrocarbon layer from separator 22 is passed through conduit 110 having valve 111 to fractionating column 112. From fractionator 112, an overhead fraction consisting of normally gaseous materials is passed through conduit 113 having valve 114 to absorber 115, and the remaining material, which consists chiefly of aromatic hydrocarbons and dissolved hydrogen fluoride, is passed through conduit 116 having valve 117 to column 27, wherein it is treated as already described.

In absorber 115, which preferably contains conventional packing material, bubble trays, or the like, the gaseous material passes upwardly and countercurrently to downwardly flowing concentrated hydrofluoric acid, whereby alkyl fluorides are absorbed by the acid. The alkyl fluoride-free gases are removed at the top of absorber 115 through outlet 118 having valve 119. The concentrated acid is introduced near the top of absorber 115 through conduit 120 having valve 123, or from conduits 58 or 93 through valves 122 or 121, respectively; it passes downwardly through the absorber, absorbs alkyl fluorides, and is passed from the bottom of the absorber through conduit 124 having valve 125 to alkylator 14.

In instances in which the product does not contain an objectionable proportion of organic fluorine, the bottom fraction from column 27 may be by-passed around defluorinator 63 through conduit 126 having valve 127 directly to separating means 66. In other instances, any desired fraction of the ethylated benzene may be first isolated and then treated to remove objectionable organic fluorine; for example, the desired ethylbenzene recovered through conduit 71 may be so treated, whereas fractions comprising chiefly unreacted benzene and/or polyethylbenzene may be recycled to the process without removal of organic fluorine. Also, if defluorinator 63 is used to remove organic fluorine from the kettle product of column 27, a re-treatment of the ethylbenzene fraction in a second or auxiliary defluorinating step, not shown, may be advantageous to remove final traces of such fluorine.

In addition to the arrangement shown in the drawings, there are many other modifications of my invention which will be obvious from the present disclosure and discussion to those skilled in the art. For example, under some conditions of operation a concurrent gas washer may be substituted for the countercurrent absorber described herein. In some cases, as when centrifuges are used in the steps for separating two liquid phases of different densities, the use of solvent extractors, such as extractors 30 and 57, to aid the separation, may be unnecessary. Additional pumps, valves, fractionators, separators, conduits, and the like, such as are well-known in the art of chemical engineering may be used wherever they are necessary or convenient for obtaining the results indicated. It is also considered to be within the scope of this invention to use catalyst modifiers, such as inorganic or organic compounds resistant to hydrofluoric acid, in the alkylating zone to increase the efficiency of the reaction, to increase the mutual solubility of the reactants and hydrofluoric acid, or the like; polar organic compounds resistant to hydrofluoric acid, such as certain nitrogen- and/or oxygen-containing compounds, are especially advantageous in this respect.

As previously mentioned, my invention applies generally to the alkylation of benzene to form monoalkyl derivatives, particularly to using the normally gaseous olefins ethylene, propylene or the butylenes to form monalkyl benzenes in which the alkyl group has two to four carbon atoms. When using propylene or the butylenes less rigorous alkylation conditions are needed, and alkylation temperatures as low as 30° F. or lower may be used. In such cases, the paraffins which usually accompany the olefins may supplement or completely take the place of the low-boiling solvents introduced through conduits 23, 41, and/or 88.

To illustrate further some aspects of the invention, the following specific examples and experimental data are given.

Example I

To a steel reaction vessel having a mechanical stirrer were charged 2.2 pounds of substantially anhydrous hydrofluoric acid and 2.3 pounds of technical-grade benzene. During a period of 15 minutes, during which the mixture was stirred vigorously, a total of 0.07 pound of ethylene was added. The mixture was agitated for twenty minutes more, and was then withdrawn for examination. The average temperature during the reaction was 196° F., and the average pressure was 150 pounds per square inch gage.

The hydrocarbon product was found to contain ethylbenzene and diethylbenzene in the ratio of 85.8 to 14.2. The total alkylate represented a yield of about 90 per cent of the theoretical based upon the ethylene charged. The hydrofluoric acid phase from the run was found to contain 2.2 per cent of dissolved hydrocarbon material.

Example II

In a continuous run for alkylating benzene with ethylene in the presence of substantially anhydrous hydrofluoric acid as a catalyst, a feed consisting of 95 per cent benzene by weight and 5 per cent ethylene was injected at the rate of 140 grams per hour through a jet having a diameter of 0.066 inch into the bottom of a vertical cylindrical stainless steel reactor having a diameter of 0.75 inch and a length of 54 inches and containing 300 grams of substantially anhydrous hydrofluoric acid. The temperature was maintained at 300° F., and the pressure at 1500 pounds per square inch; the reaction time was estimated to be about 5 minutes. From the top of the reactor the mixture passed through a conduit cooled externally by ice water to a gravity settling chamber. An acid layer from the bottom of the settling chamber flowed by gravity back to the reactor; a hydrocarbon layer was withdrawn from the top of the settling chamber.

By fractional analysis of samples of the feed and of the hydrocarbon product, it was found that over 95 per cent of the ethylene in the charge had been converted to ethylbenzene and diethylbenzene in the ratio 93.1 parts ethylbenzene to 6.9 parts diethylbenzene.

Example III

To a steel reactor having a mechanical stirrer were charged 11.5 pounds of substantially anhydrous hydrofluoric acid and 15.7 pounds of chemically pure benzene. During a period of 60 minutes, 1.18 pounds of ethylene was gradually added while the mixture was stirred vigorously. The mixture was agitated for 30 minutes more. The average temperature was 115° F., and the average pressure was 40 pounds per square inch gage. A liquid hydrocarbon product was obtained which consisted of 80.3 per cent monoethylbenzene by weight, 16.8 per cent diethylbenzene, and 2.9 per cent other polyethylbenzenes. A minor fraction of normally gaseous product was recovered which consisted of 85.3 per cent ethyl fluoride by volume, 6.3 per cent methyl fluoride, and 8.4 per cent other gases. Although some material was inadvertently lost in handling, 92 per cent of the original ethylene was accounted for in the products. The used acid from the run was found to contain some dissolved polyethylbenzene, most of which appeared to be hexaethylbenzene. On contacting the used acid with benzene for some hours, the content of polyethylbenzene decreased, forming lower-boiling ethylated benzenes, mostly monoethylbenzene.

My invention provides a practical process for alkylating benzene with ethylene in the presence of substantially anhydrous hydrofluoric acid as a catalyst to produce ethylbenzene. Among special features disclosed herein is a novel means for recovering ethyl fluoride, produced as a by-product, and utilizing it as alkylating agent in the process, thereby augmenting the yield of ethylbenzene. Another special feature is a novel step to convert polyethylbenzenes, produced by polyethylation and/or secondary reactions, to ethylbenzene, and simultaneously revivifying or purifying hydrofluoric acid used as catalyst in the alkylating step. A further novel feature is the use of a hydrocarbon solvent of low density and of relatively low miscibility with hydrofluoric acid to aid in separating two liquid phases, namely, a hydrofluoric acid phase and an aromatic hydrocarbon phase, and subsequently passing the extract to a distillation step wherein the solvent aids in separating dissolved and/or suspended hydrogen fluoride from the aromatic hydrocarbons.

It will be appreciated that the invention may be practiced otherwise than as specifically described herein, and many modifications and variations of it will be obvious to those skilled in the art from the disclosure, and may be practiced without departing from the spirit of the teachings or from the scope of the claims.

I claim:

1. In a process for alkylating benzene with a normally gaseous olefin in the presence of concentrated hydrofluoric acid as a acatalyst, the steps which comprise separating normally gaseous materials from the effluent from an alkylating zone, contacting said normally gaseous materials with liquid substantially anhydrous hydrofluoric acid to absorb alkyl fluorides contained therein, and passing the resulting absorbate to said alkylating zone.

2. In a process for alkylating benzene with ethylene in the presence of concentrated hydrofluoric acid as a catalyst, in which process an intimate mixture comprising hydrofluoric acid and benzene is to be separated into an acid phase and a phase comprising the major proportion of said benzene, the improvement which comprises adding to said mixture a substantial proportion of a paraffin having four to five carbon atoms per molecule, whereby separation into said phases is facilitated.

3. The improvement of claim 2, in which said paraffin is normal butane.

4. The process which comprises reacting benzene with ethylene in an alkylating zone in the presence of concentrated hydrofluoric acid as a catalyst, separating the effluent from the alkylating zone into an acid phase and an aromatic hydrocarbon phase, fractionally distilling the aromatic hydrocarbon phase to remove and recover free hydrogen fluoride, contacting the remaining aromatic hydrocarbon material with a hydrogenation-dehydrogenation type catalyst to remove organically combined fluorine, and separating ethylbenzene from the resulting fluorine-free hydrocarbon.

5. A process for producing a monoalkyl benzene in which the alkyl group has two to four carbon atoms which comprises, reacting benzene with an olefin of two to four carbon atoms per molecule in the presence of concentrated hydrofluoric acid as the alkylating catalyst to form alkyl benzenes, separating from effluents of said reaction a liquid hydrofluoric acid phase and a hydrocarbon phase, admixing with said liquid hydrofluoric acid phase liquid butane in an extraction step to recover dissolved hydrocarbon material from said hydrofluoric acid, separating said liquid butane from said liquid acid and admixing said liquid butane with the aforesaid hydrocarbon phase to form a hydrocarbon admixture, subjecting said hydrocarbon admixture to fractional distillation and recovering a low-boiling mixture containing butane together with all the hydrofluoric acid contained in said hydrocarbon material, cooling and condensing said low-boiling mixture to form a liquid butane phase and a liquid hydrofluoric acid phase, returning said hydrofluoric acid to said alkylation, returning said butane phase to said extraction step, and recovering also from said distillation a substantially pure monoalkyl benzene.

6. The process which comprises: contacting a mixture of ethylene and a molar excess of benzene with substantially anhydrous hydrofluoric acid under alkylation conditions in an alkylation step; separating the resulting reaction mixture into an acid phase and a hydrocarbon phase; extracting said acid phase under liquid-phase conditions in an extraction step with a paraffin having four to five carbon atoms per molecule; admixing the resulting hydrocarbon extract with said hydrocarbon phase; distilling from the resulting hydrocarbon admixture said paraffin, together with hydrofluoric acid that had been dissolved in said hydrocarbon phase, as a low-boiling distillate; separating said distillate into an acid phase and a paraffin phase; recycling said last-mentioned acid phase to said alkylation step; recycling said paraffin phase to said extraction step; separating the residue from the distilling step into ethylated benzene and unreacted benzene; recycling said unreacted benzene to said alkylation step; and withdrawing said ethylated benzene from the process.

7. The process of claim 6 in which said ethylated benzene, prior to withdrawal from the process, is contacted with bauxite under such conditions that organic fluorine present in traces is substantially removed.

8. A process for producing a monoalkyl benzene in which the alkyl group has two to four carbon atoms which comprises, reacting benzene with an olefin of two to four carbon atoms per molecule in the presence of concentrated hydrofluoric acid as the alkylating catalyst to form alkyl benzenes, separating from effluent of said reaction a liquid hydrofluoric acid phase and a hydrocarbon phase, admixing with said liquid hydrofluoric acid phase liquid butane in an extraction step to recover dissolved hydrocarbon material from said hydrofluoric acid, separating said liquid butane from said liquid acid and admixing said butane with the aforesaid hydrocarbon phase, subjecting the resulting hydrocarbon admixture to fractional distillation and recovering a low-boiling mixture containing butane together with all the hydrofluoric acid contained in said hydrocarbon material, cooling and condensing said low-boiling mixture to form a liquid butane phase and a liquid hydrofluoric acid phase, returning said hydrofluoric acid to said alkylation, returning said butane phase to said extraction step, recovering also from said distillation a substantially pure monoalkyl benzene, recovering further from said distillation a polyalkyl benzene fraction, admixing said polyalkyl benzene fraction with an excess of benzene and at least a portion of the liquid hydrofluoric acid from said extraction step, subjecting said admixture to a superatmospheric pressure and a temperature within the range of 250 to 600° F. to produce monoalkyl benzene, separating effluents of said treatment into a hydrocarbon phase and a hydrofluoric acid phase, and passing said hydrocarbon phase to said fractional distillation.

9. A process for producing a monoalkyl benzene, which comprises reacting benzene with a low-boiling olefin in the presence of concentrated hydrofluoric acid as alkylating catalyst under alkylating conditions to form alkyl benzenes, separating from effluents of said alkylation a liquid hydrofluoric acid phase and a hydrocarbon phase, recovering from said hydrocarbon phase a monoalkyl benzene as a product of the process and a polyalkyl benzene, passing at least a portion of said liquid hydrofluoric acid phase and said polyalkyl benzene to a second reaction zone and contacting the same therein with an excess of benzene under reaction conditions more drastic than said alkylating conditions to effect a dealkylation of said polyalkyl benzene and at least a partial revivification of said liquid hydrofluoric acid, and recovering a monoalkyl benzene from effluents of said second reaction zone.

10. In a process for alkylating a low-boiling aromatic hydrocarbon with a low-boiling olefin in the presence of concentrated hydrofluoric acid as a catalyst, the steps which comprise separating normally gaseous materials from the effluent from an alkylating zone, contacting normally gaseous materials with liquid substantially anhydrous hydrofluoric acid to absorb alkyl fluorides contained therein, and passing the resulting absorbate to said alkylating zone.

11. In a process for alkylating a low-boiling aromatic hydrocarbon with a low-boiling olefin in the presence of concentrated hydrofluoric acid as a catalyst, in which process an intimate mixture comprising hydrofluoric acid and said low-boiling aromatic hydrocarbon is to be separated into an acid phase and a phase comprising the major portion of said low-boiling aromatic hydrocarbon, the improvement which comprises adding to said mixture a substantial portion of a paraffin having four to five carbon atoms per molecule, whereby separation into said phases is facilitated.

12. The process which comprises reacting a low-boiling aromatic hydrocarbon with a low-boiling olefin in an alkylating zone in the presence of concentrated hydrofluoric acid at a catalyst, separating the effluent from the alkylating zone into an acid phase and an aromatic hydrocarbon phase, fractionally distilling the aromatic hydrocarbon phase to remove and recover free hydrogen fluoride, contacting the remaining aromatic hydrocarbon material with a hydrogenation-dehydrogenation type catalyst to remove organically combined fluorine, and separating a mono alkyl derivative of said low-boiling aromatic hydrocarbon from the resulting fluorine-free hydrocarbon material.

FREDERICK E. FREY.